(12) United States Patent
Jose et al.

(10) Patent No.: US 12,087,280 B2
(45) Date of Patent: Sep. 10, 2024

(54) SYSTEM AND METHOD FOR ROBUST WAKEWORD DETECTION IN PRESENCE OF NOISE IN NEW UNSEEN ENVIRONMENTS WITHOUT ADDITIONAL DATA

(71) Applicant: Harman International Industries, Incorporated, Stamford, CT (US)

(72) Inventors: George Jose, Karnataka (IN); Jigar Mistry, Gujarat (IN); Aashish Kumar, Karnataka (IN); Srinivas Kruthiventi Subrahmanyeswara Sai, Bangalore (IN); Rajesh Biswal, Karnataka (IN)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 239 days.

(21) Appl. No.: 17/662,058

(22) Filed: May 4, 2022

(65) Prior Publication Data

US 2022/0399007 A1    Dec. 15, 2022

(30) Foreign Application Priority Data

Jun. 11, 2021    (IN) ............................. 202141026114

(51) Int. Cl.
*G10L 15/16*     (2006.01)
*G10L 15/05*     (2013.01)
(Continued)

(52) U.S. Cl.
CPC .............. *G10L 15/05* (2013.01); *G10L 15/16* (2013.01); *G10L 15/22* (2013.01); *G10L 2015/088* (2013.01); *G10L 15/20* (2013.01)

(58) Field of Classification Search
CPC ......... G10L 15/04; G10L 15/05; G10L 15/22; G10L 15/16; G10L 2015/088; G10L 15/20; G06N 20/20
See application file for complete search history.

(56) References Cited

U.S. PATENT DOCUMENTS 9,972,304 B2 *    5/2018    Paulik .................. G10L 15/063
10,297,253 B2 *   5/2019    Walker, II ............... G10L 15/22
(Continued)

OTHER PUBLICATIONS

Lin, M. et al., "Network In Network," ArXiv Cornell University Website, Available Online at https://arxiv.org/abs/1312.4400, Available as Early as Dec. 16, 2013, 10 pages.
(Continued)

*Primary Examiner* — Vijay B Chawan
(74) *Attorney, Agent, or Firm* — McCoy Russell LLP

(57) ABSTRACT

The current disclosure relates to systems and methods for wakeword or keyword detection in Virtual Personal Assistants (VPAs). In particular, systems and methods are provided for wakeword detection using deep neural networks including a parametric pooling layer, wherein the parametric pooling layer includes trainable parameters, enabling the layer to learn to distinguish between informative feature vectors and non-informative/noisy feature vectors extracted from a variable length acoustic signal. In one example, a parametric pooling layer may aggregate a variable length feature map, comprising a plurality of feature vectors extracted from an acoustic signal, into an embedding vector of pre-determined length, by weighting each of the plurality of feature vectors based on one or more learned parameters in a parametric pooling layer, and aggregating the plurality of weighted feature vectors into the embedding vector.

17 Claims, 6 Drawing Sheets

(51) Int. Cl.
  *G10L 15/22* (2006.01)
  *G10L 15/08* (2006.01)
  *G10L 15/20* (2006.01)

(56) References Cited

U.S. PATENT DOCUMENTS

| | | | |
|---|---|---|---|
| 10,311,872 B2* | 6/2019 | Howard | G10L 15/22 |
| 10,446,143 B2* | 10/2019 | Akbacak | G06F 40/166 |
| 10,747,498 B2* | 8/2020 | Stasior | G06F 3/0604 |
| 2020/0105256 A1* | 4/2020 | Fainberg | G10L 15/16 |
| 2020/0125820 A1* | 4/2020 | Kim | G06N 20/10 |
| 2020/0184966 A1* | 6/2020 | Yavagal | G10L 15/30 |

OTHER PUBLICATIONS

Chen, X. et al., "Small-Footprint Keyword Spotting with Graph Convolutional Network," Proceedings of the 2019 IEEE Automatic Speech Recognition and Understanding Workshop (ASRU), Dec. 14, 2018, Singapore, 8 pages.

Sørensen, P. et al., "A depthwise separable convolutional neural network for keyword spotting on an embedded system," EURASIP Journal on Audio, Speech, and Music Processing, vol. 2020, No. 1, Jun. 25, 2020, 14 pages.

Bai, Z. et al., "Speaker recognition based on deep learning: An overview," Neural Networks, vol. 140, Aug. 2021, 35 pages.

European Patent Office, Extended European Search Report Issued in Application No. 22172649.0, Oct. 10, 2022, Germany, 14 pages.

Shan, C. et al., "Attention-based End-to-End Models for Small-Footprint Keyword Spotting," arXiv Cornell University Website, Available Online at https://arxiv.org/abs/1803.10916, Available as Early as Mar. 29, 2018, 5 pages.

Xie, W. et al., "Utterance-Level Aggregation for Speaker Recognition in the Wild," arXiv Cornell University Website, Available Online at https://arxiv.org/abs/1902.10107, Available as Early as Feb. 26, 2019, 6 pages.

"Noise Robustness of Temporal Pooling Methods for Keyword Spotting," Anonymous ICME Submission, Available as Early as Apr. 12, 2021, 7 pages.

* cited by examiner

SYSTEM AND METHOD FOR ROBUST WAKEWORD DETECTION IN PRESENCE OF NOISE IN NEW UNSEEN ENVIRONMENTS WITHOUT ADDITIONAL DATA

CROSS REFERENCE TO RELATED APPLICATIONS

The present application claims priority to Indian Patent Application No. 202141026114 entitled "SYSTEM AND METHOD FOR ROBUST WAKEWORD DETECTION IN PRESENCE OF NOISE IN NEW UNSEEN ENVIRONMENTS WITHOUT ADDITIONAL DATA", and filed on Jun. 11, 2021. The entire contents of the above-listed application is hereby incorporated by reference for all purposes.

FIELD

The current disclosure relates to systems and methods for wakeword or keyword detection in Virtual Personal Assistants (VPAs). In particular, the current disclosure is directed to wakeword detection using deep neural networks including global pooling layers.

BACKGROUND AND SUMMARY

Voice based Virtual Personal Assistants (VPAs), which can interact with users via voice commands and give intelligent responses, have become very popular. Alexa, Cortana, Ok Google, and Bixby are just a few examples of VPAs which are becoming increasingly ubiquitous in daily life. VPAs use wakeword detection as a trigger to start an interaction with a user, and similarly use keyword or keyphrase detection to determine an action/response to take based on user commands. A VPA may continuously employ wakeword detection to try and detect the presence of a wakeword (e.g., "Alexa", "Bixby") in user utterances. Due to the widespread usage of VPAs, wakeword detection is likely to be conducted in a large range of environments, with a wide range of ambient sounds (e.g., a quiet living room, in a vehicle cabin, or in a crowd). Thus, it is a recognized challenge in the field of VPAs to produce wakeword detection able to accurately determine when a user has spoken a wakeword under the various, and often unpredictable, conditions encountered by a VPA. Additionally, impulse noises which are short burst noises might cause the system to miss the wakeword. It is therefore generally desired to produce systems and methods for wakeword detection which are robust to different sound conditions, without needing to collect extensive data for each potential sound condition.

Further, as VPAs are generally operated on resource constrained devices (e.g., smart speakers, smart headphones, cellphones, etc. as opposed to servers), there is an additional challenge of producing not only accurate and noise robust wakeword detection, but wakeword detection which is able to operate continuously, even on resource constrained devices, and without substantial latency between when a user utters a wakeword or keyword, and when the VPA takes appropriate action in response.

The inventors herein provide systems and methods for increasing wakeword detection robustness to noise using deep neural networks. In one example, the current disclosure provides a method for keyword detection, comprising, acquiring a variable length acoustic signal via an audio recording subsystem, transforming the variable length acoustic signal to a variable length feature map using a feature extractor, wherein the variable length feature map comprises a plurality of feature vectors, aggregating the plurality of feature vectors using a parametric pooling layer to form an embedding vector, wherein the embedding vector is of a pre-determined length, mapping the embedding vector to a classification score for a pre-determined keyword using a classifier, comparing the classification score against a classification score threshold, and responding to the classification score exceeding the classification score threshold by retrieving instructions indexed in non-transitory memory by the pre-determined keyword and executing the instructions. The parametric pooling layer includes trainable parameters, enabling the layer to learn to distinguish between informative feature vectors and non-informative/noisy feature vectors extracted from a variable length acoustic signal. In comparison to conventional pooling approaches, which use non-parametric (that is, non-trainable) pooling operations (e.g., max pooling, average pooling), the current disclosure provides parametric pooling layers which may learn to weight informative feature vectors more than noisy feature vectors during an aggregation process. The parametric pooling layers taught herein are particularly advantageously applied to detection of keywords or wakewords in variable length acoustic signals, such as are acquired in VPAs, as conventional pooling layers may dilute the informative features extracted from a small subset of the timesteps of a variable length acoustic signal (average pooling), or may mischaracterize an acoustic signal by over-emphasizing features extracted from a particular timestep while ignoring the overall properties of the acoustic signal (max pooling).

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

Figure 1:
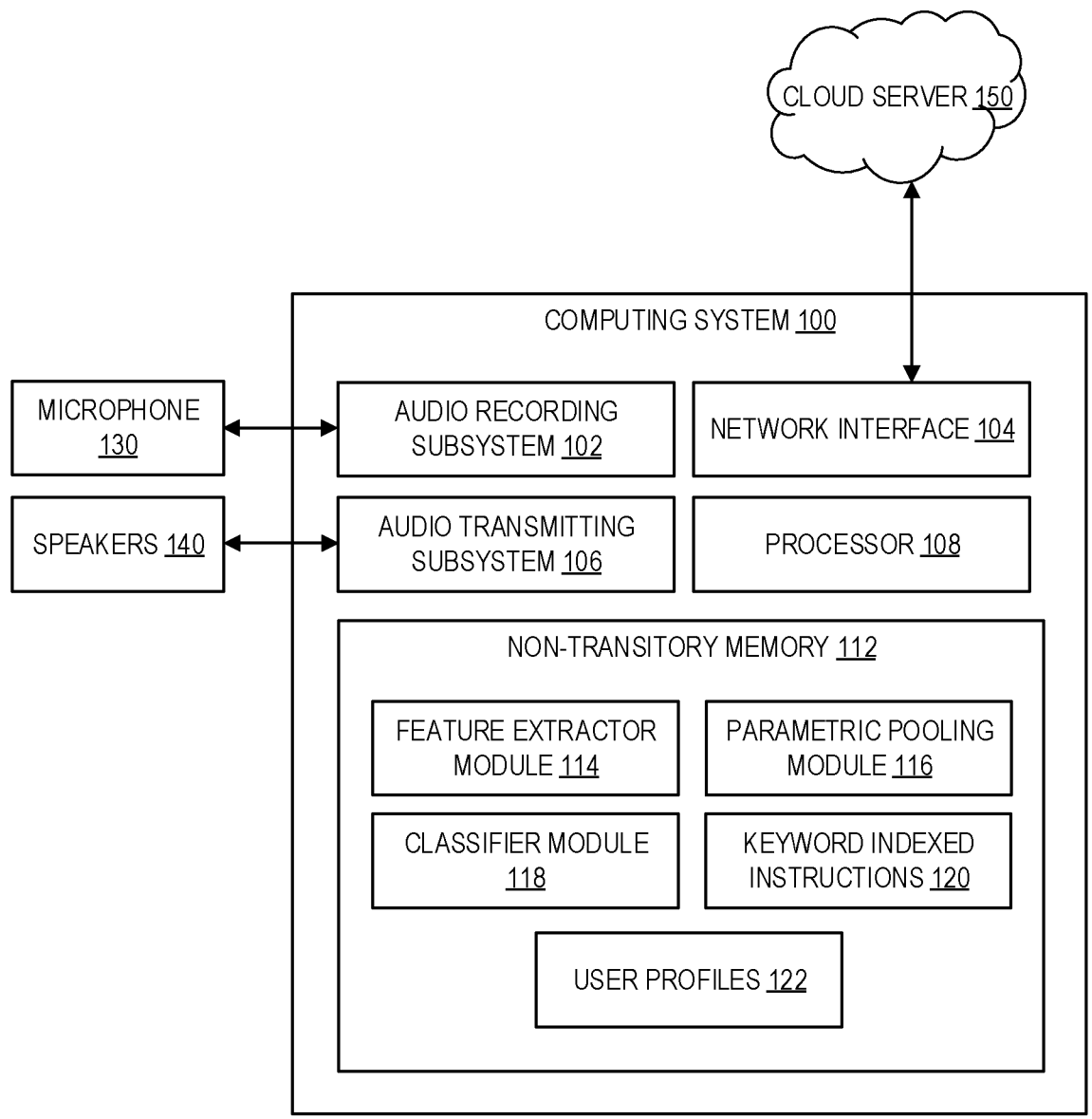
FIG. 1 shows a computing system configured to implement a wakeword or keyword detection.

The present disclosure is directed to systems and methods for wakeword detection using deep neural networks. In particular, aspects of the current disclosure are directed to enabling deep neural networks to efficiently and accurately detect the presence of a keyword or wakeword in a recorded acoustic signal, even in the presence of noise not encountered during a training process.

In recent years, effort has been made in the field of Virtual Personal Assistants (VPAs) to develop low footprint Deep Neural Network (DNN) based wakeword identification systems which can run efficiently on resource-constrained devices. Convolutional Neural Networks (CNNs), a particular type of Deep Neural Network, have been a major tool in building such identification systems. A CNN may comprise several convolutional layers, followed by a global pooling layer and a fully connected layer (FC). While convolution layers extract the relevant features present in the input, the FC layer is responsible for the final classification based on these extracted features. The global pooling layer acts as a bridge between the convolutional layer which can handle variable sized inputs, and the FC layer which accepts only a fixed size input. The global pooling (herein also referred to simply as the pooling layer) layer summarizes the information present in the variable sized feature maps by aggregating it into a compact fixed-size embedding vector. A property of a good pooling layer is that during the aggregation operation the pooling layer focuses more on useful information and eliminates the unnecessary information from the feature maps. In the context of wakeword identification, the network should give more importance to speech regions in comparison with non-speech regions. Non-speech regions often contain information irrelevant to discriminate between the keywords, therefore a desired feature of a pooling method is the ability to pay less attention to the features present in these regions, and conversely, to pay more attention to the informative regions.

In the presence of noise, the inventors herein have recognized that incorrect predictions occur mainly due to two reasons: dilution of information, which may occur during operations such as average pooling wherein informative regions of an acoustic signal are uniformly blended with less informative/noisy regions to produce the embedding vector, and truncation of information, which may occur during operations such as max pooling wherein two or more informative features of a given type occur, but only a single maximum feature of each feature type is carried forward to the next layer, thereby truncating information which may be more dispersed throughout the acoustic signal.

Conventional approaches to improve the noise robustness of DNN based wakeword detection systems rely on acquiring or synthesizing noisy data, and using this noisy data during a training process of the DNN. However, such approaches require substantial time and resources to acquire or synthesize the noisy data, and even then the type of noise may not fully encapsulate the range of possible sound environments into which VPAs may be deployed, that is, such training based approaches may produce models which do not generalize well to acoustic signals including noise not included in the training data set. Further, even with training on large datasets including various types of noise, this still does not resolve the issues of information dilution or information truncation.

Figure 4:
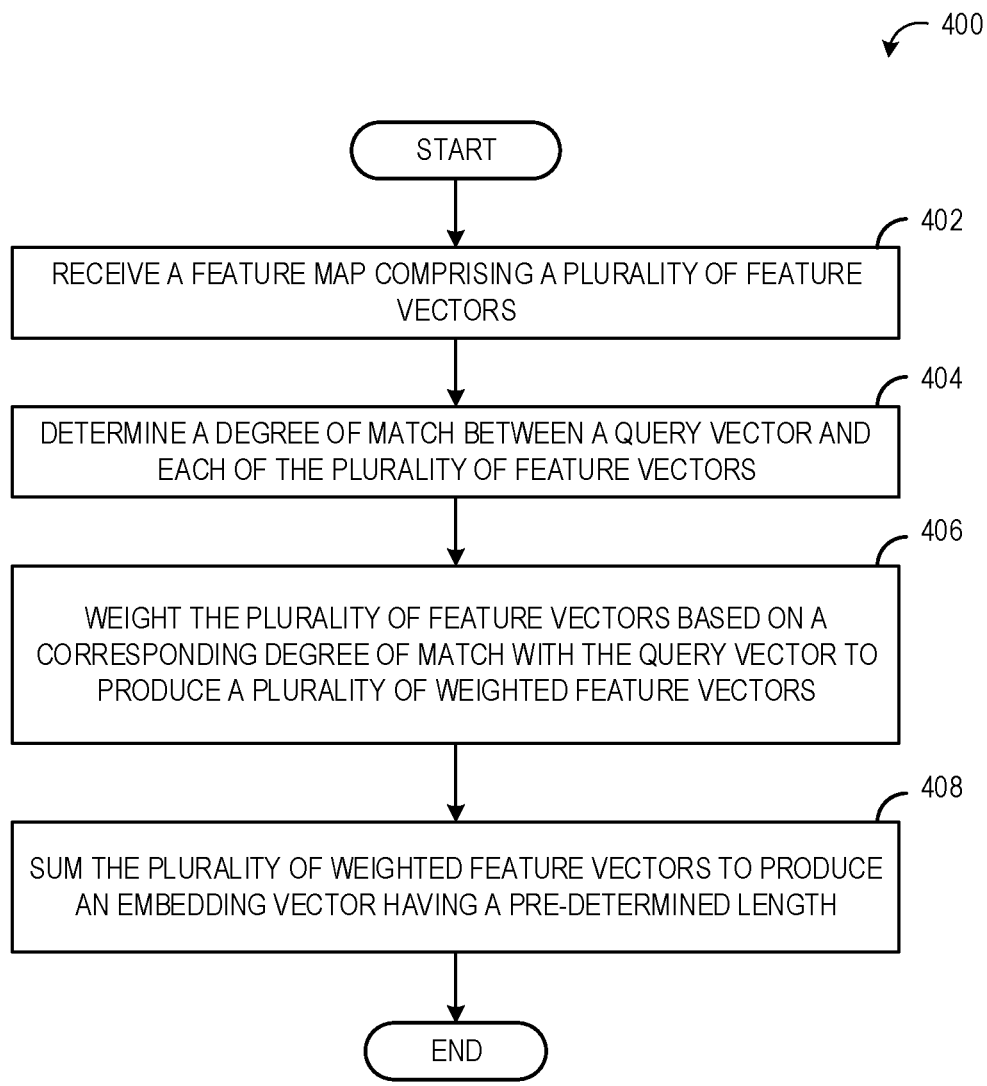
FIG. 4 shows a flowchart of a first method for parametrically pooling a plurality of feature vectors.
Figure 5:
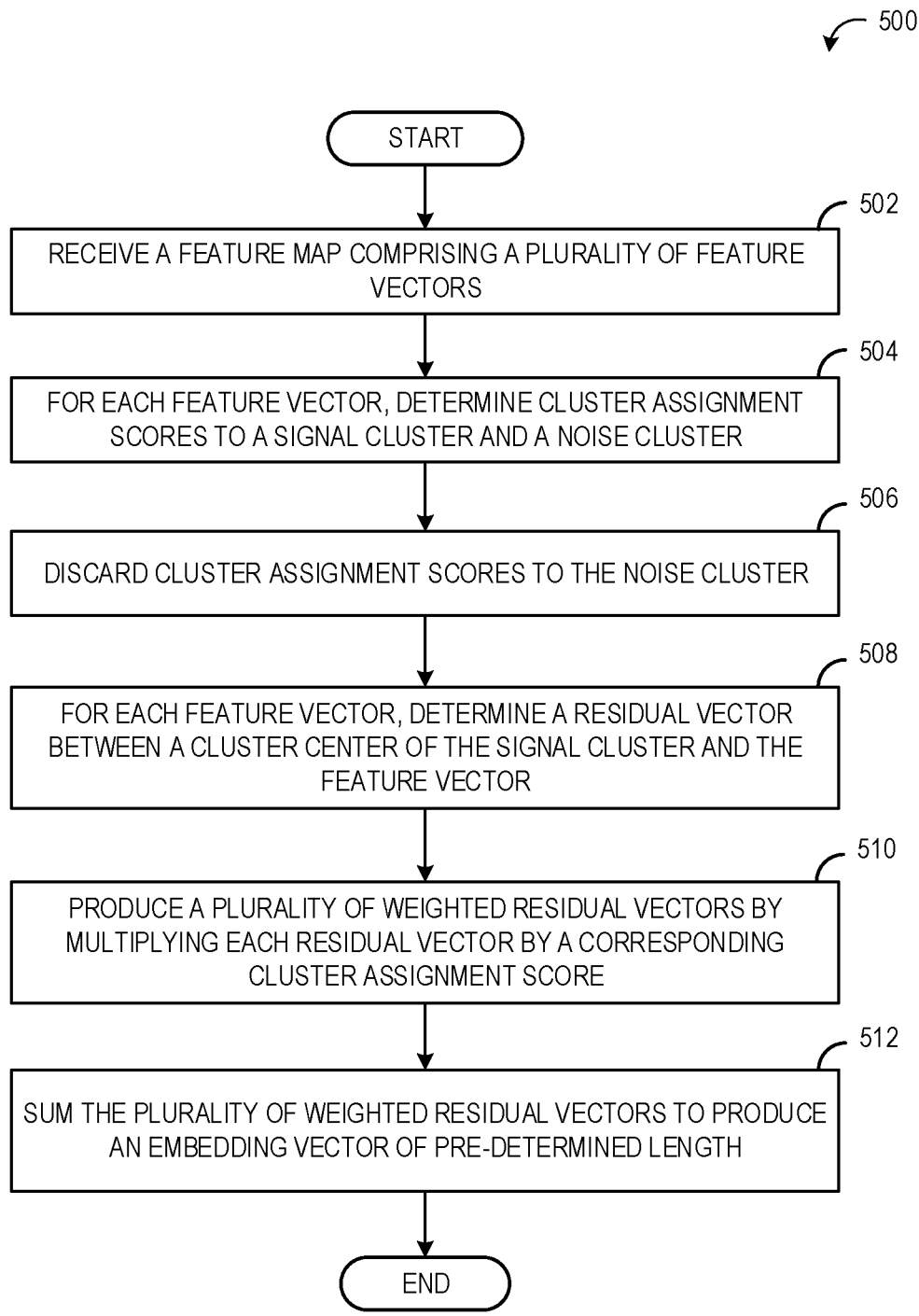
FIG. 5 shows a flowchart of a second method for parametrically pooling a plurality of feature vectors.
Figure 6:
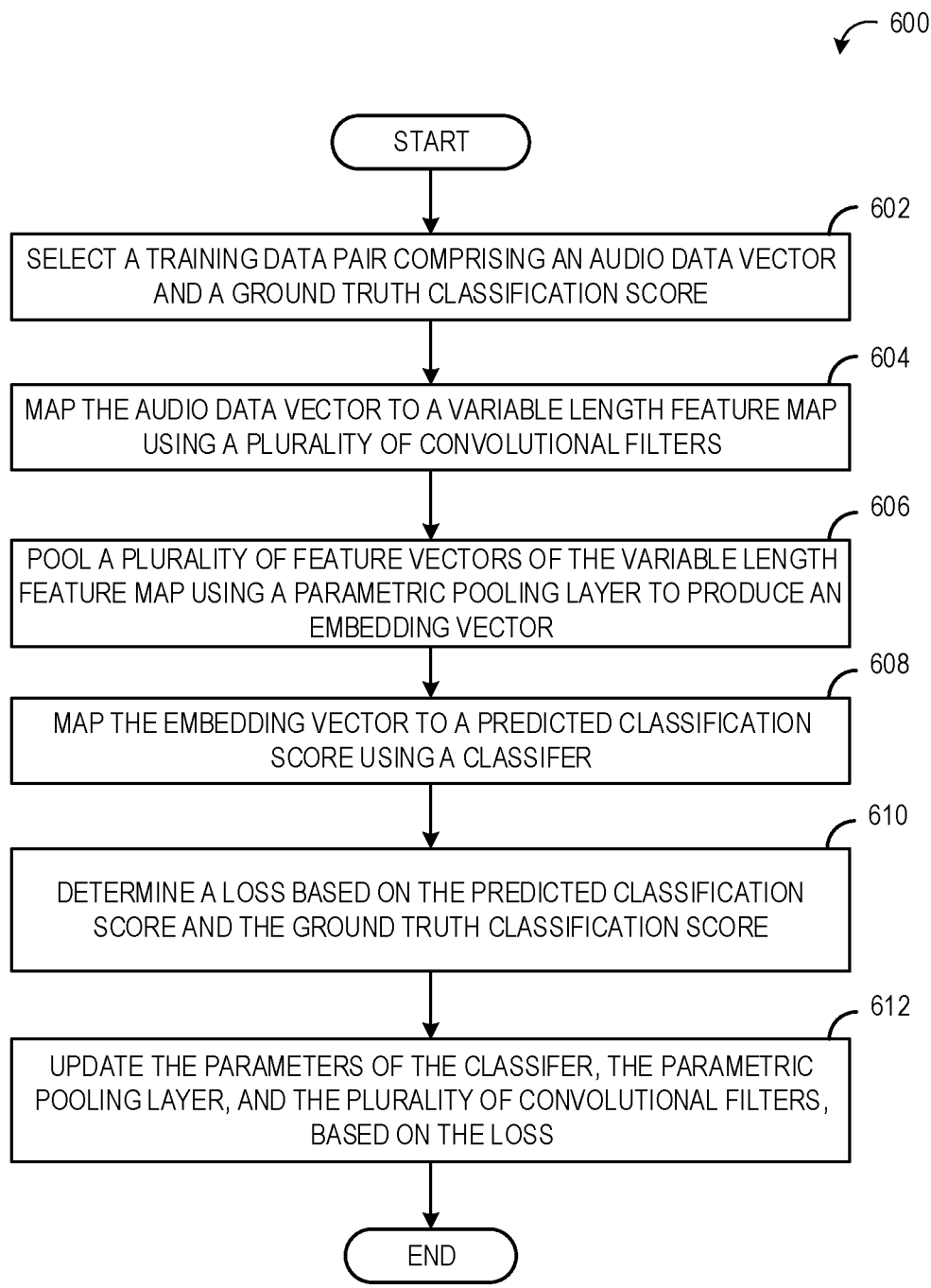
FIG. 6 shows a flowchart of a method for training a deep neural network including a parametric pooling layer to detect a presence of a wakeword or keyword in an acquired acoustic signal.

The inventors herein have discovered that by performing global pooling of feature vectors extracted from audio data using a parametric pooling layer, comprising a plurality of trainable parameters which are configured to learn to distinguish between informative and non-informative feature vectors, an embedding vector may be produced which represents a compact yet robust numerical representation of an input acoustic signal. By learning to discriminate between informative feature vectors and less informative feature vectors, the parametric pooling layers taught herein reduce both information dilution and information truncation which may cause an accuracy of keyword detection to suffer in the presence of noise. In particular, by assigning weights to each of a plurality of feature vectors based on a learned degree of importance/information content, the impact of noisy feature vectors are down-weighted in comparison to less noisy/more informative feature vectors, while still maintaining the ability to extract information from a plurality of features extracted at different points in time. In one example, a computing system 100, shown in FIG. 1, may implement a wakeword or keyword detection method 300, shown in FIG. 3, by employing a DNN 200, shown in FIG. 2. DNN 200 includes a parametric pooling layer 212, which may pool a variable number of feature vectors in a variable length feature map into a fixed length embedding vector using one or more learned parameters. A first embodiment of a method 400 for parametrically pooling feature vectors using a learned query vector is shown in FIG. 4, and a second embodiment of a method 500 for parametrically pooling feature vectors based on clustering to both signal and noise clusters is shown in FIG. 5. FIG. 6 shows an example method 600 which may be used to train a DNN including a parametric pooling layer in an end-to-end manner using a plurality of training data pairs, wherein the training data pairs In this way, it is possible to improve the performance of deep learning based wakeword detection models, without the need for collecting additional data, thereby saving cost. Further, the described approach may also improve the general performance of existing technologies by enabling the technologies to focus more on speech regions of acoustic signals in comparison to non-speech regions.

Turning to FIG. 1, a computing system 100, configured to implement wakeword/keyword detection, is shown. In some embodiments, at least a portion of computing system 100 is disposed at a remote device (e.g., an edge device, cloud server 150, etc.) communicably coupled to computing system 100 via wired and/or wireless connections. System 100 includes a processor 108, communicably coupled to an audio recording subsystem 102, an audio transmitting subsystem 106, a network interface 104, and non-transitory memory 112, wherein processor 108 may execute instructions stored in non-transitory memory 112 to perform one or more of the steps of methods 300, 400, 500, and 600, disclosed herein.

Computing system 100 includes audio recording subsystem 102, wherein audio recording subsystem 102 is configured to record an acoustic signal from a surrounding area using microphone 130, transform the acoustic signal into a digital form, and transmit the digitized acoustic signal to a processor 108 for further processing. In one example, audio recording subsystem 102 may transmit a digitized acoustic signal to a DNN for keyword/wakeword detection. In some embodiments, audio recording subsystem may monitor ambient noise levels using microphone 130 and record an acoustic signal in response to a pre-determined criterion being met. In one example, a criteria may include a decibel level of ambient noise measured by microphone 130 exceeding a pre-determined decibel threshold. In another example, microphone 130 may continue recording an acoustic signal for a dynamically determined duration of time, wherein the duration may be based upon a determination by computing system 100 that a criteria remains satisfied (e.g., an ambient noise level remaining above a pre-determined threshold decibel level). Thus, acoustic signals acquired by audio recording subsystem 102 may be of variable length.

Computing system 100 includes audio transmitting subsystem 106. Audio transmitting subsystem 106 may receive a command signal from processor 108, and may transmit sound into a surrounding area using speakers 140 based on the command signal. In one example, processor 108 may generate an audio message, such as a greeting, or an answer to a previously received query, and may transmit the audio message to audio transmitting subsystem 106 to be played via speakers 140.

Computing system 100 further includes network interface 104. Network interface 104 may be configured to communicate with one or more remotely located devices or computing systems, such as cloud server 150, via private or public networks. In some examples, network interface 104 may transmit data, such as digitized acoustic signals, embedding vectors, feature maps, or other data, to a remotely located device, and/or may receive data, such as an embedding vector, user profile data, and a feature map, from the remotely located device.

Computing system 100 includes a processor 108 configured to execute machine readable instructions stored in non-transitory memory 112. Processor 108 may be single core or multi-core, and the programs executed thereon may be configured for parallel or distributed processing. Processor 108 may be communicably coupled to a plurality of devices, including non-transitory memory 112, audio recording subsystem 102, audio transmitting subsystem 106, and network interface 104, and may transmit data to, or receive data from, the plurality of devices. In some embodiments, the processor 108 may optionally include individual components that are distributed throughout two or more devices, which may be remotely located and/or configured for coordinated processing. In some embodiments, one or more aspects of the processor 108 may be virtualized and executed by remotely-accessible networked computing devices configured in a cloud computing configuration.

Non-transitory memory 112 comprises a plurality of addressed memory locations, wherein data may be stored in a non-transitory manner as discrete bits. Data stored on non-transitory memory may be read and executed by processor 108, to perform one or more of the operations discussed herein. Non-transitory memory 112 may comprise digital storage means such as hard drive disks (HDDs), or solid state drives (SSDs).

Non-transitory memory 112 includes feature extractor module 114. In some embodiments, feature extractor module 114 may store one or more trained feature extractors. In an example, a feature extractor may comprise a plurality of parameters, and instructions for transforming input data into a feature map using the plurality of parameters. In an example, a feature extractor may comprise one or more convolutional filters, wherein a convolutional filter comprises a plurality of learned weights in a fixed relative position, and feature extractor module 114 may store the learned weights, along with the relative positions of each of the weights within the convolutional filter, and instructions for applying the convolutional filter to input data to extract features corresponding to the learned weights from the input data. Feature extractor module 114 may further store metadata associated with one or more feature extractors stored therein. In an example, feature extractor module 114 may include metadata indicating a training dataset used to train each of the feature extractors stored therein, and a testing accuracy of the feature extractors.

Non-transitory memory 112 includes parametric pooling module 116. In some embodiments, parametric pooling module 116 may store one or more trained parametric pooling layers. In an example, a parametric pooling layer may comprise a plurality of parameters, and instructions for aggregating a variable length feature map into a single embedding vector of pre-determined length using the plurality of learned parameters. In an example, parametric pooling layer may comprise one or more query vectors, or one or more cluster assignment vectors, comprising a plurality of learned values in a fixed order, and parametric pooling module 116 may store the learned values, along with the fixed order of each of the values within the query vector or cluster assignment vector, and instructions for applying the query vector or feature assignment vector to a feature map to produce a single embedding vector. Parametric pooling module 116 may further store metadata associated with one or more parametric pooling layers stored therein. In an example, parametric pooling module 116 may include metadata indicating a training dataset and test accuracy for each of the plurality of parametric pooling layers.

Non-transitory memory 112 includes classifier module 118. In some embodiments, classifier module 118 may store one or more trained classifiers for determining a classification score for one or more classes of interest using an embedding vector. In an example, a classifier may comprise one or more fully connected (FC) layers, each fully connected layer comprising a plurality of learned parameters. The classifier module 118 stores the plurality of learned parameters of the FC layers, and instructions for applying the plurality of parameters to an embedding vector to determine one or more classification scores for one or more classes of interest (e.g., keywords, key-phrases, user profiles, etc.). Classifier module 118 may further store metadata associated with one or more classifiers stored therein. In an example, classifier module 118 may include metadata indicating a training dataset and test accuracy for each of the plurality of classifiers.

Non-transitory memory 112 includes keyword indexed instructions 120. Keyword indexed instructions 120 may include a plurality of instructions, which may be executed by processor 108 in response to detection of an associated keyword. In one example, each set of instructions may be associated with a uniquely corresponding keyword, to form a plurality of key-value pairs, wherein the keyword serves as the key, and the corresponding instructions serve as the value. In this way, computing system 100 may rapidly access instructions in response to detection of a keyword utterance by a user by querying keyword indexed instructions 120 using the detected keyword. In some examples, keywords may be stored in a hashed form, enabling more rapid query. Instructions stored at keyword indexed instructions 120, when executed by processor 108, may cause processor 108 to adjust one or more operating parameters of computing system 100. In a first example, when executing a keyword indexed set of instructions, processor 108 may be configured to generate an audio response, and broadcast the audio response via audio transmitting subsystem 106. In another example, when executing a keyword indexed set of instructions, processor 108 may be configured to adjust a volume setting of speakers 140. In another example, when executing a keyword indexed set of instructions, processor 108 may be configured to adjust a brightness of one or more lights communicably coupled thereto.

Non-transitory memory 112 includes user profiles 122. User profiles 122 may include data associated with an account of a user, such as user preferences, user credentials, a user name, and a password. In one example, each user account may be associated with a template embedding vector, representing user voice characteristics in a compact numerical representation, which may be used to identify a currently speaking user. In one example, user profiles 122 may store one or more template embedding vectors generated by a parametric pooling layer based on features extracted from one or more template utterances of a user. As an example, a user may be prompted to repeat a pre-determined set of template phrases, and each phrase may be recorded as an acoustic signal. For each of the template phrases, a feature map may be produced using a feature extractor. The feature maps may then be passed through a parametric pooling layer, generating a template embedding vector for each of the template phrases. The template embedding vectors associated with each user profile may serve as a vocal "fingerprint", uniquely identifying a particular individual based on compactly represented numerical properties extracted from the template phrases. By parametrically pooling the feature maps produced from the template phrases, template embedding vectors may be produced which show less variance based on background noise, thus enabling greater speaker identification accuracy even in conditions of low signal-to-noise ratio.

Figure 2:
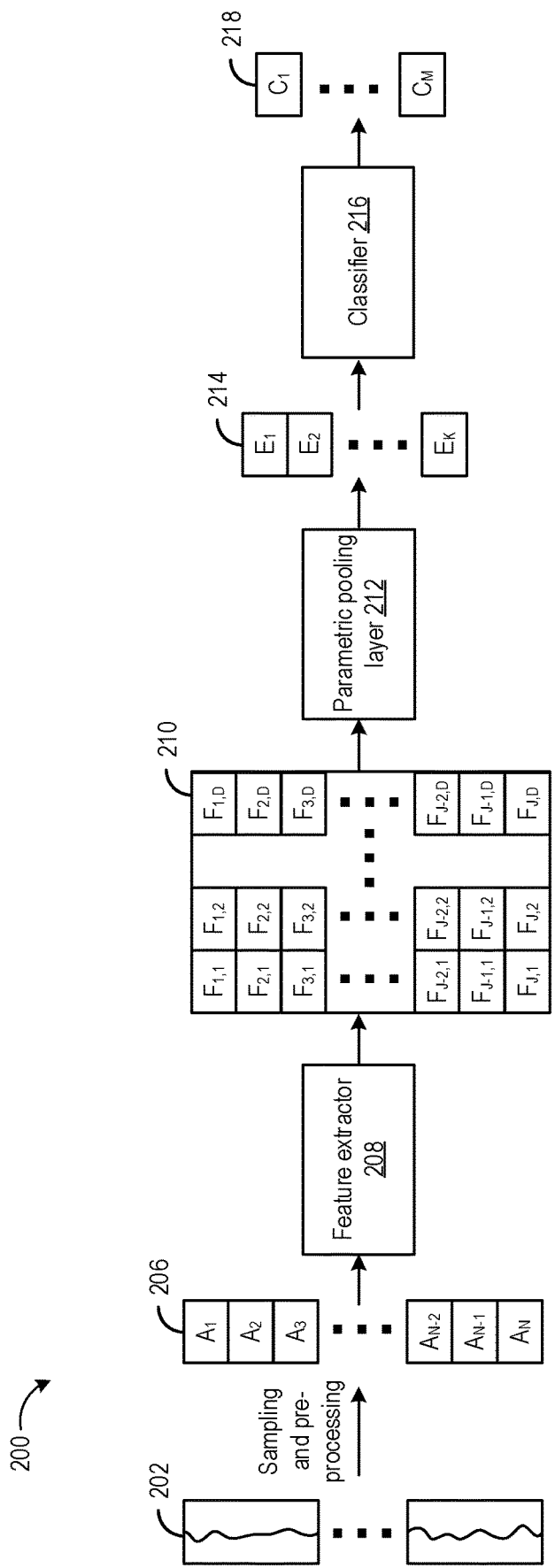
FIG. 2 shows an example deep neural network which may be employed to automatically detect a presence of a keyword or wakeword in a variable length acoustic signal.

Turning to FIG. 2, a DNN 200 is shown. DNN 200 may be implemented by a computing system, such as computing system 100, to detect utterance of a keyword or key-phrase. DNN 200 comprises a feature extractor 208, a parametric pooling layer 212 located downstream of the parametric pooling layer, and a classifier 216 located downstream of the parametric pooling layer 212. DNN 200 is configured to produce a classification score for one or more classes of interest (e.g., keywords, wakewords, user identities etc.) from a variable length acoustic signal.

As shown by acoustic signal 202 and audio data vector 206, a variable duration acoustic signal 202 may be sampled and preprocessed by the computing system to produce a variable length audio data vector 206. Acoustic signal 202 represents continuous pressure waveforms acting on a microphone of the computing system, which may be transduced into discrete values at pre-determined timesteps (or said another way, at a pre-determined sampling rate). The sequence of sampled values from the variable length acoustic signal 202 is shown as a vector of audio data values $A_1$, $A_2 \ldots A_N$, where N is the total number of audio data values in variable length audio data vector 206. N depends on both the duration of time over which the acoustic signal 202 is sampled, as well as the sampling rate, and thus for a constant sampling rate, a length of audio data vector 206 will be proportional to the duration of time over which the acoustic signal 202 was sampled. Note, the ellipses in both acoustic signal 202 and audio data vector 206 are intended to illustrate the variability of length in these quantities.

The duration of time over which acoustic signal 202 is sampled may be dynamically determined based on one or more conditions assessed in real time, and thus may be of greater or lesser length depending on the conditions and how said conditions evolve over time. In one example, the acoustic signal may be sampled over a duration of time in which a measured or inferred decibel level of the acoustic signal exceeds a pre-determined threshold. Pre-processing of raw sampled acoustic data values may include one or more of filtering (e.g., high pass filtering, low pass filtering, etc.), frequency decomposition (e.g., using a Fast Fourier Transform FFT to separate the acoustic signal into separate frequency channels), and other pre-processing techniques known in the art of digital audio. In some embodiments, raw sampled acoustic data values may be used to determine Mel Frequency Cepstral Coefficients (MFCCs). The MFCCs may be normalized using cepstral mean and variance normalization (CMVN), prior to being passed to feature extractor 208. In some embodiments, raw sampled acoustic data values may be used to determine Mel features, which may then be passed to feature extractor 208. In another embodiment, raw sampled acoustic data values may be used to determine Per-Channel Energy normalized (PCEN) features, which may then be fed to feature extractor 208.

Although audio data vector 206 is shown as a single vector, it will be appreciated that the current disclosure provides for a plurality of audio data vectors. In one example, an acoustic signal may be decomposed into a plurality of frequencies, and each of the plurality of frequencies may be stored as a separate audio data vector. However, the inventors herein have determined that by representing an acquired acoustic signal as a vector, a one-dimensional (1D) data structure, as opposed to a two-dimensional (2D) data structure (or higher dimensional data structure), a computational efficiency of keyword detection may be increased, as a number of computations by the feature extractor, parametric pooling layer, and classifier, may be substantially reduced, while preserving accuracy of keyword detection. This computational efficiency may be of particular benefit to systems implementing VPAs, as such system may have limited memory and/or processing power.

The variable length audio data vector 206 is fed to feature extractor 208, wherein the plurality of audio data values comprising the audio data vector 206 are transformed into a variable length feature map 210, wherein a length in at least a first dimension of variable length feature map 210 is proportional to the duration of the acoustic signal 202. Feature extractor 208 may comprise a deep neural network, such as a convolutional neural network (CNN) or recurrent neural network (RNN). A benefit of both CNNs and RNNs for keyword detection in variable length audio data vectors, such as audio data vector 206, is their ability to extract features from a variable length of input data, using a fixed number of parameters. In particular, CNNs extract features using filters of finite receptive field size which are passed over each portion of the input data, thus for larger inputs a larger number of strides may be used, but the number of learned parameters does not increase. Similarly, RNNs use a same set of parameters to extract features from each time step, or span of timesteps, and thus as the length of variable length audio data vector 206 increases, a number of parameters (and thus a memory footprint) of an RNN based feature extractor does not increase.

In some embodiments, feature extractor 208 is a CNN, and includes one or more convolutional layers, wherein each convolutional layer comprises a respective plurality of convolutional filters. Each convolutional filter in turn comprises a plurality of learned weights in a fixed arrangement, such that during feature extraction, portions of audio data vector 206 matching the values and arrangement of the weights in the convolutional filter produce a larger output feature value than portions of audio data vector 206 not matching the values or arrangement of the weights in the filter. The features so determined are propagated to a next layer, or to the variable length feature map 210 in the case of the last convolutional layer.

Convolutional filters receive as input a pre-determined span of values from the input variable length audio data vector 206 (or from a feature map produced by an upstream convolutional layer), which is referred to as the receptive field. Convolutional filters are "strided" along the variable length audio data vector 206, determining feature values for each portion of the input data covered by the receptive field for the current stride. For 1D audio data vectors, a first convolutional layer of feature extractor 208 may be configured with 1D convolutional filters, comprising a vector of length L, where L is the receptive field size and is equal to or less than the length of the variable length audio data vector 206. In one example, feature extractor 208 may comprise one or more convolutional filters with a receptive field size of 9. For each distinct filter applied to an input vector or feature map, an additional layer is added to an output feature map.

Variable length feature map 210 comprises a plurality of feature vectors. Each row of variable length feature map 210 represents a feature vector, as shown in FIG. 2. The feature vector to which a value in variable length feature map 210 belongs is indicated by the first subscript, e.g., value $F_{1,2}$ is the second value of the first feature vector. As can be seen, variable length feature map 210 comprises J feature vectors, wherein J is a positive integer greater than 0, and is a function of the sampled duration of the acoustic signal 202. As such, J is proportional to N, although J may or may not be equal to N based on the operations performed by feature extractor 208. J represents the length of variable length feature map 210, as this value is a function of the duration acoustic signal 202 sampled, and as the duration of acoustic signal 202 sampled is dynamically determined, J may be of variable size.

Each column of variable length feature map 210 comprises a same type of feature, that is, features extracted by a same convolutional filter. The column to which a value in variable length feature map 210 belongs is indicated by the second subscript, thus, value $F_{3,1}$ and value $F_{J,1}$, represent a first feature extracted from a third interval of time, and the first feature extracted from a $J^{th}$ interval of time, respectively. As can be seen, variable length feature map 210 comprises D columns, where D is a positive integer greater than 1, and thus each feature vector of variable length feature map 210 comprises D features, produced by D distinct convolutional filters.

The variable length feature map 210 is passed to parametric pooling layer 212, wherein the plurality of feature vectors comprising feature map 210 are aggregated into an embedding vector 214. The parametric pooling layer 212 is positioned between the feature extractor 208, and the classifier 216. Embedding vector 214 is of pre-determined length K, that is, embedding vector 214 includes a pre-determined number (K) of values, despite the variable size of feature map 210. In one example, the length, K, of embedding vector 214 is equal to the number of feature types/channels in variable length feature map 210. In some embodiments, the length, K, of embedding vector 214 is equal to the number of feature types/channels in variable length feature map 210 multiplied by a number of signal clusters, wherein the number of signal clusters is a positive integer greater than zero. The inventors herein have determined that a tradeoff exists between a length, K, of the embedding vector 214, and the computational efficiency of keyword detection, wherein although a richness of features may increase with K, the computational efficiency of determining a presence of a keyword in an utterance may decrease with K. Thus, parametric pooling layer 212 may be referred to as a global pooling layer, as the entirety of feature map 210 is aggregated to a single fixed length embedding vector 214. However, in contrast to conventional global pooling layers, parametric pooling layer 212 includes one or more learned parameters, wherein said learned parameters intelligently weight the plurality of feature vectors based on an assessment of how informative each of the plurality of feature vectors are to the downstream classification task (as discussed in more detail in the description of FIGS. 4 and 5).

The embedding vector 214 is then fed to classifier 216. Classifier 216 may comprise one or more fully connected layers, wherein each fully connected layer may comprise a plurality of learned weights and biases. Output from the one or more fully connected layers may pass through an activation function before passing to a next layer. In one example, activation functions may include rectified linear units (ReLU) or other activation functions known in the art of machine learning. In one example, a number of input nodes of classifier 216 may equal a length of embedding vector 214, and a number of output nodes of classifier 216 may equal a pre-determined number of classes for which classification scores are to be produced. In one example, classifier 216 may comprise a binary classifier, wherein for an input embedding vector, classifier 216 produces a classification score indicating if the embedding vector is, or is not, a member of a particular class. In some embodiments classifier 216 may comprise a multi-class classifier, wherein for an input embedding vector, classifier 216 determines a plurality of classification scores for a plurality of classes.

Classifier 216 may output one or more classification scores as a classification score vector 218, wherein the number of rows (M) in classification score vector 218 equals the number of classes for which classification scores were predicted by classifier 216. In embodiments where classifier 216 is a binary classifier M may equal two, that is classification score vector 218 may comprise a first classification score indicating a degree of certainty with which the classifier 216 assigns the embedding vector 214 to the first class, and a second classification score indicating a degree of certainty with which the classifier assigns the embedding vector 214 to all other classes. In embodiments where classifier 216 comprises a multi-class classifier, the length, M, of the classification score vector includes a number of classification scores equal to the number of classes for which predictions are to be made. As an example, in a multi-class classifier configured to predict if an acoustic signal includes an utterance of "volume", "weather", or "no", the length of classification score vector 218, M, may be equal to three. Classification score vector 218 may be normalized, such as by performing a softmax normalization, wherein each of the plurality of classification scores in classification score vector 218 are transformed such that the sum of the classification scores is one, and each classification score may be interpreted as a probability of an acoustic signal including the keyword or key-phrase associated with the classification score.

Thus, DNN 200 provides one example of a DNN architecture which may be employed to perform keyword detection on an acoustic signal. It will be appreciated that DNN 200 is provided as an illustrative example, and is not intended to limit the scope of the disclosure in anyway. In particular, other DNN architectures may be used with the parametric pooling operations taught herein to improve the richness of information captured by an embedding vector or embedding vectors. In particular, the parametric pooling operations discussed herein may be beneficially employed in global pooling of feature maps of greater than two-dimensions.

Figure 3:
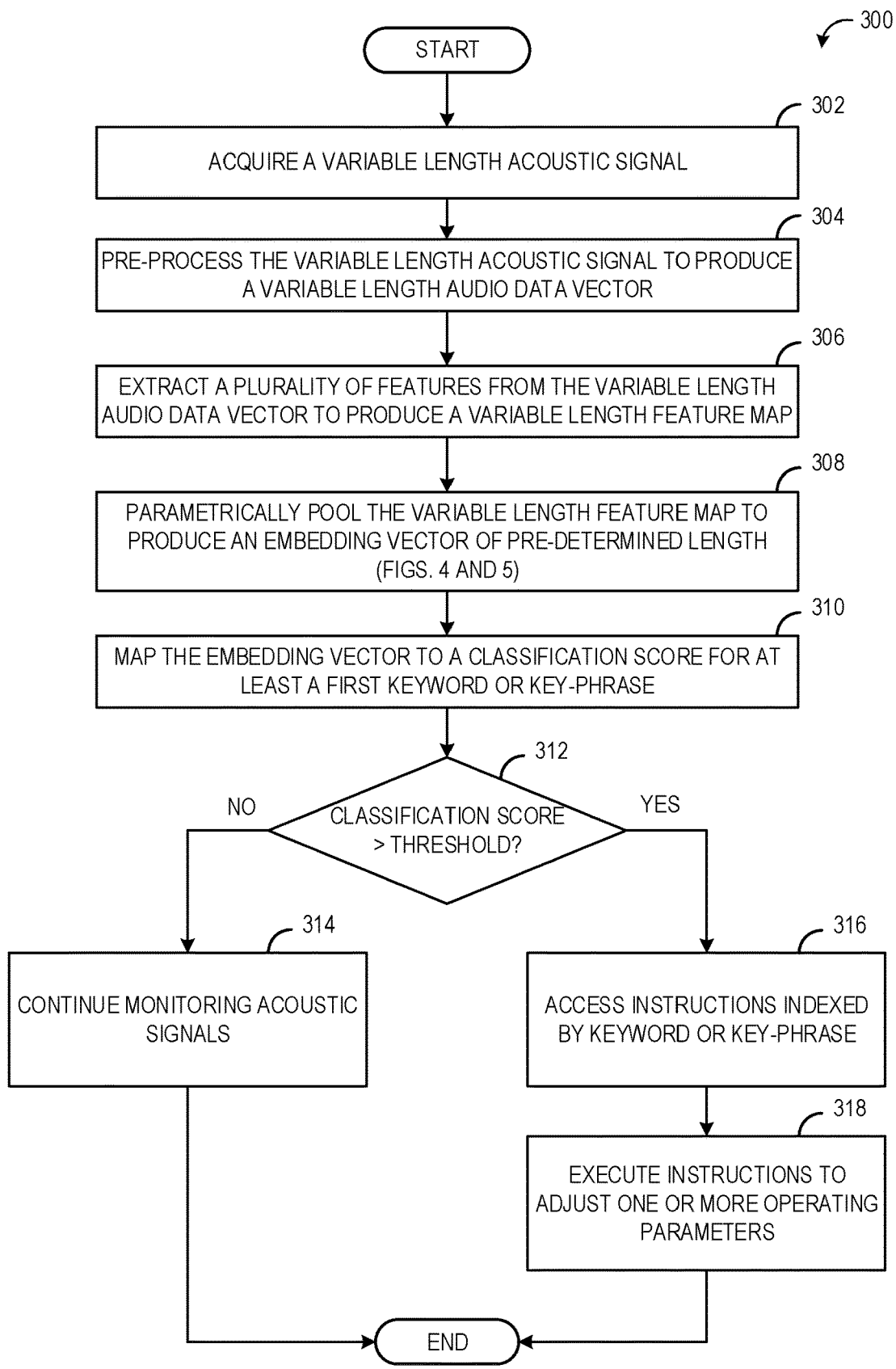
FIG. 3 shows a flowchart of a method for detecting a wakeword or keyword and performing one or more actions triggered thereby.

Turning to FIG. 3, a flowchart showing an example method 300 for detecting a keyword, and taking action based thereon, is shown. One or more of the steps of method 300 may be executed by a computing system, such as computing system 100 shown in FIG. 1.

At operation 302, the computing system acquires a variable length acoustic signal over a duration of time via a sound recording subsystem. In one example, an acoustic signal received by a microphone of the sound recording subsystem over the duration of time may be sampled at discrete, pre-determined timesteps, to produce a digital representation of the acoustic signal. The duration of time over which the acoustic signal is sampled may be determined based on one or more conditions, measured or estimated by the computing system in real time, and thus may be of variable length. In one example, a sampling rate of the acoustic signal may be dynamically adjusted based on one or more measured or estimated conditions. In some embodiments, the variable length acoustic signal acquired at operation 302 includes an utterance, wherein a portion of the duration of time over which the utterance occurs is from 1% to 10% of the duration of time.

At operation 304, the computing system pre-processes the variable length acoustic signal to produce a variable length audio data vector. In one example, pre-processing of sampled acoustic data values may include one or more of filtering (e.g., high pass filtering, low pass filtering, band pass filtering, etc.), frequency decomposition (e.g., using a Fast Fourier Transform FFT to separate the acoustic signal into separate frequency channels), and other pre-processing techniques known in the art of digital audio.

At operation 306, the computing system extracts a plurality of features from the variable length audio data vector to produce a variable length feature map, using a feature extractor. A length of the variable length feature map may be a function of the length of the audio data vector representation of the sampled acoustic signal, as the feature extractor may determine a feature vector for each of a plurality of intervals of time over which the acoustic signal was sampled. In some embodiments, a feature vector is produced by the feature extractor for each timestep over which the acoustic signal was sampled, that is, each audio data values acquired at a single timestep are mapped to a corresponding feature vector by the feature extractor. In some embodiments, a feature vector is produced for each continuous span of timesteps over which the acoustic signal was sampled, that is, audio data values acquired at two or more continuous timesteps may be mapped to a single feature vector by the feature extractor. Feature extractor 208 may comprise a deep neural network, such as a convolutional neural network (CNN), a recurrent neural network (RNN) or a residual neural network (ResNet). In one example, at operation 306, the computing system may extract a plurality of feature vectors from the variable length audio data vector using a plurality of learned convolutional filters, wherein a number of the plurality of feature vectors is proportional to the length of the variable length audio data vector, which may in turn be proportional to a duration of the acoustic signal acquired at operation 302, and wherein each of the plurality of feature vectors encodes a plurality of features extracted by the feature extractor from a pre-determined interval of time of the duration of time.

At operation 308, the computing system parametrically pools the variable length feature map to produce an embedding vector of pre-determined length using a parametric pooling layer (discussed in more detail in the description of FIGS. 4 and 5, below). Parametric pooling may comprise aggregating or pooling the variable length feature map along a temporal dimension, using one or more learned parameters to weight the features extracted at each timestep (or span of timesteps). The weighted features may then be aggregated/summed along the time dimension, to produce a single set of features of pre-determined length. As the variable dimension of the variable length feature map is the temporal dimension, pooling along the temporal dimension serves to condense the information in the variable length feature map into a fixed length embedding vector.

In some embodiments, at operation 308 the computing system parametrically pools the variable length feature map comprising a plurality of feature vectors by determining a first cluster assignment score for a feature vector of the plurality of feature vectors to a signal cluster, determining a second cluster assignment score for the feature vector to a noise cluster, normalizing the first cluster assignment score based on a sum of the first cluster assignment score and the second cluster assignment score to produce a normalized cluster assignment score, determining a residual for the feature vector by subtracting a center point of the signal cluster from the feature vector, weighting the residual with the normalized cluster assignment score to produce a weighted residual vector, and aggregating the weighted residual with a plurality of residual vectors produced from the plurality of feature vectors to form the embedding vector.

In some embodiments, at operation 308, the computing system parametrically pools the variable length feature map by producing a plurality of cluster assignment scores for each of the plurality of feature vectors to each of a plurality of clusters, wherein the plurality of clusters comprises at least one signal cluster and at least one noise cluster, discarding a portion of the plurality of cluster assignment scores corresponding to the at least one noise cluster, producing a plurality of residual vectors by determining a difference between a center point of the at least one signal cluster and each of the plurality of feature vectors, weighting each of the plurality of residual vectors based on a corresponding cluster assignment score of the plurality of cluster assignment scores to produce a plurality of weighted feature vectors, and summing the plurality of weighted feature vectors to form the embedding vector.

In some embodiments, at operation 308, the computing system parametrically pools the variable length feature map by aggregating the plurality of feature vectors of the variable length feature map by determining for each of the plurality of feature vectors a degree of match with a query vector, weighting each of the plurality of feature vectors based on a respective degree of match with the query vector to form a plurality of weighted feature vectors, and summing the plurality of weighted feature vectors to form the embedding vector.

As discussed above in the background/summary, a particular issue in keyword/wakeword detection for VPAs is the unpredictable nature of the ambient noise prevailing during deployment of the VPAs. As such, the information content of feature vectors extracted at different timesteps (or spans of timesteps) may vary, that is, a first feature vector of a variable length feature map extracted from an acoustic signal sampled at a first timestep may encode acoustic information more useful for the downstream classification task than a second feature vector extracted from an acoustic signal sampled at a second timestep. By providing a parametric pooling layer, wherein the parametric pooling layer comprises one or more differentiable (that is, trainable) pooling parameters, the parametric pooling layers may learn to weight feature vectors based on the correlation of the information encoded by the feature vectors with the downstream classification scores. Said another way, the parametric pooling layer may learn to distinguish between less useful and more useful feature vectors (wherein "useful" refers to an ability of said feature vector to correctly inform a downstream classification score prediction).

At operation 310, the computing system maps the embedding vector to a classification score for at least a first keyword or key-phrase. The classifier may comprise one or more fully connected layers, wherein each fully connected layer may comprise a plurality of learned weights and biases. In one example, a number of input nodes of the classifier may equal a length of the embedding vector produced at operation 308, and a number of output nodes of the classifier may equal a pre-determined number of classes for which classification scores are to be produced. The classifier may comprise a binary classifier, or multi-class classifier. The classifier may output one or more classification scores for one or more keywords, wherein each classification score indicates a probability of the acoustic signal sampled at operation 302 including the keyword.

At operation 312, the computing system determines if the classification score for a keyword of interest is greater than a classification score threshold. In some embodiments, the classification score threshold may be pre-determined. In some embodiments, the classification score threshold may be dynamically determined based on one or more additional classification scores produced by the classifier for the acoustic signal. If at operation 312 the computing system determines the classification score is not greater than the classification score threshold, the computing system may respond by proceeding to operation 314, wherein the computing systems continues monitoring acoustic signals. Following operation 314, method 300 may end.

However, if at operation 312 the computing system determines that the classification score is greater than the classification score threshold, method 300 proceeds to operation 316. At operation 316, the computing system responds to the classification score being greater than the classification score threshold by, accessing instructions indexed by the keyword or key-phrase identified in the acoustic signal. In some embodiments, the computing system may be communicably coupled to one or more non-transitory memory devices, storing instructions indexed by keyword, such as is described above in the description of FIG. 1. In some embodiments, a keyword detected in the acoustic signal may be mapped to a memory address using a data structure such as a dictionary, wherein the keyword or a derivation of the keyword (e.g., a hash computed for the keyword) is used as the key in the data structure, and the value associated with the key is a memory address indicating a start of a set of instructions to be executed in response to detection of the keyword.

At operation 318, the computing system executes the instructions received at operation 316, and performs one or more actions based thereon. In one example, the computing systems executes the instructions to adjust one or more operating parameters of the computing system. In some examples, operating parameters may include one or more of a volume setting for one or more speakers of an audio transmitting subsystem, a brightness setting of one or more lights communicably coupled to the computing system, or a currently streaming media content. Following operation 318, method 300 may end. In this way, method 300 may enable automatic detection of a user utterance of a keyword or key-phrase in variable noise conditions, and execute instructions based on the detected keyword or key-phrase to perform one or more actions, such as adjusting an operating parameter or commanding a communicably coupled device to perform an action associated with the detected keyword.

Turning to FIG. 4, a flowchart showing a first example method 400 for parametrically pooling a plurality of feature vectors, is shown. One or more of the steps of method 400 may be executed by a computing system, such as computing system 100 shown in FIG. 1. Method 400 may be executed as part of one or more methods disclosed herein. In particular, method 400 may be executed at operation 308 of method 300 to aggregate the variable length feature map to produce the embedding vector of pre-determined length.

Method 400 begins at operation 402, wherein the computing system receives a feature map comprising a plurality of feature vectors. The plurality of feature vectors comprise a pre-determined number of feature types, for each of a plurality of timesteps or spans of timesteps of an acoustic signal, as discussed in more detail in the description of FIG. 2, above.

At operation 404, the computing system determines a degree of match between a query vector and each of the plurality of feature vectors. The query vector comprises a plurality of learned weights, wherein each learned weight of the query vector corresponds to a feature type/feature channel in each of the plurality of feature vectors received at operation 402. The length of the query vector may equal the length of the plurality of feature vectors, that is, a length L of the query vector may be equal to the number of distinct feature types D in a first feature vector of the plurality of feature vectors. The computing system may determine the degree of match between each feature vector and the query vector by computing a dot product between each feature vector and the query vector, as shown in the equation below:

$$d_i = x_i q$$

where $x_i$ is a feature vector at timestep (or time interval) i, q is the learned query vector, and $d_i$ is the degree of match between feature vector i and query vector q. The dot product between two vectors is a scalar, thus the degree of match determine between a first feature vector and the query vector is a scalar value indicating the degree of match between the first feature vector and the query vector.

The degree of match for each feature vector may be normalized, such as by taking the softmax of the of degree of match as shown in the equation below:

$$a_i = \frac{e^{d_i}}{\sum_{k=1}^{N} e^{d_i}}$$

where $a_i$ is the normalized degree of match for feature vector i, e is Euler's number, $d_i$ is the un-normalized degree of match for feature vector i, and N is the total number of feature vectors in the variable length feature map.

At operation 406, the computing system weights the plurality of feature vectors based on a corresponding degree of match with the query vector to produce a plurality of weighted feature vectors. In one example, the computing system may weight each of the feature vectors using a corresponding degree of match as indicated by the equation below:

$$V_i = a_i x_i$$

where $V_i$ is the weighted feature vector i derived from feature vector i, produced by multiplying feature vector $x_i$ by a corresponding normalized degree of match $a_i$.

At operation 408, the computing system sums the plurality of weighted feature vectors to produce an embedding vector having a pre-determined length according to the below equation:

$$E = \sum_{i=1}^{N} V_i$$

Where E is the embedding vector having a pre-determined length, and $V_i$ and N are as described above. In one example, the length of embedding vector E is equal to the number of features D in each of the plurality of feature vectors in the variable length feature map received at operation 402. The embedding vector so obtained may be used for one or more downstream tasks, including keyword detection and/or speaker identity verification. Following operation 408, method 400 may end.

Turning to FIG. 5, a flowchart showing a second example method 500 for parametrically pooling a plurality of feature vectors, is shown. One or more of the steps of method 500 may be executed by a computing system, such as computing system 100 shown in FIG. 1.

At operation 502, the computing system receives a feature map comprising a plurality of feature vectors. The plurality of feature vectors comprise a pre-determined number of feature types, for each of a plurality of timesteps or spans of timesteps of an acoustic signal, as discussed in more detail in the description of FIG. 2, above.

At operation 504, the computing system, for each feature vector of the variable length feature map received at operation 502, determines cluster assignment scores to a signal cluster and a noise cluster. In one example, cluster assignment scores may be determined according to the below equation:

$$a_{i,K} = \frac{e^{a_K^T x_i + b_K}}{\sum_{k=1}^{M} e^{a_k^T x_i + b_k}}$$

where $a_{i,K}$ is the normalized cluster assignment score of feature vector i to cluster K, $a_K^T$ is the transpose of the learned cluster assignment vector for cluster K, $x_i$ is feature vector i, $b_K$ is a bias term for cluster K, k is an index iterating over the total number of clusters M (wherein M includes both the number of signal clusters and the number of noise clusters), and e is Euler's number. The cluster assignment vector $a_K$ is a learned vector, and the bias term $b_K$ is a learned scaler value for cluster K. A potentially more intuitive description of the above equation is that, a cluster assignment score for a feature vector, to cluster K, where K may be a noise cluster or a signal cluster, is equal to a degree of match between the feature vector and the cluster assignment vector for cluster K, adjusted by a bias term, and divided by the sum of the degree of match of the feature vector to all clusters (both signal and noise clusters), wherein a total number of the clusters is M. Thus, the above cluster assignment provides a mechanism by which noisy feature vectors may be assigned more heavily (that is, have a larger cluster assignment score) to noise clusters, and more informative feature vectors may be more heavily assigned to signal clusters, using the learned parameters $a_k^T$ and $b_k$ for each cluster.

At operation 506, the computing system discards cluster assignment scores to the noise cluster(s). By discarding the cluster assignment scores to the noise clusters, the parametric pooling layer, in particular the terms $a_k^T$ and $b_k$ from the above equation, are forced to learn a distinction between informative feature vectors and noisy or less informative feature vectors, as cluster assignment scores to signal clusters are used in the determination of the embedding vector (discussed in the following operations), while cluster assignment scores to noise clusters are not directly used in the downstream determination of the embedding vector.

At operation 508, the computing system, for each feature vector, determines a residual vector between a cluster center of the signal cluster and the feature vector. One example of an equation for determining a residual vector between a feature vector and a cluster center is shown below:

$$R_{i,K} = x_i - C_K$$

where $R_{i,K}$ is the residual vector determined for feature vector $x_i$ by subtracting a center point ($C_K$) of the signal cluster K from the feature vector $x_i$. The residual vector, $R_{i,K}$, is a vector showing the displacement (that is, Euclidean distance) between a point in D dimensional space (where D is the length the feature vector $x_i$) occupied by the feature vector $x_i$ from the center point ($C_K$) of cluster K in the D dimensional space. The residual vector $R_{i,K}$ comprises a vector of length D, wherein D is the length of the feature vectors in the variable length feature map received at operation 502. It should be noted that residual vectors are not determined for noise clusters at operation 508, and are only determined for signal clusters. Thus, there is no need for the parametric pooling layer to learn the parameters $C_K$ for the noise clusters. The parameter $C_K$ is a learned parameter, and is learned independently from the cluster assignment vector and cluster assignment bias terms $a_K^T$ and $b_K$ for signal cluster K.

At operation 510, the computing system produces a plurality of weighted residual vectors by multiplying each residual vector by a corresponding cluster assignment score, as shown by the equation below:

$$V_{i,K} = a_{i,K} R_{i,K}$$

where $V_{i,K}$ is the weighted residual vector for feature vector i, to cluster K, $a_{i,K}$ is the cluster assignment of featurevector i to cluster K, and $R_{i,K}$ is the residual vector encoding the distance between feature vector i and a cluster center $C_K$ of cluster K.

At operation 512, the computing system sums the plurality of weighted residual vectors to produce an embedding vector of pre-determined length, according to the equation shown below:

$$E_K = \sum_{i=1}^{N} V_{i,K}$$

where $E_K$ is a fixed length embedding vector determined for cluster K, N is the total number of feature vectors in the variable length feature map received at operation 502, and $V_{i,K}$ is the weighted residual vector for feature vector i, to cluster K. In one example, the length of embedding vector $E_K$ is equal to the number of features D in each of the plurality of feature vectors in the variable length feature map received at operation 502. In some embodiments, a plurality of embedding vectors may be determined for a plurality of signal clusters, and in such embodiments the plurality of embedding vectors may be concatenated to form a single embedding vector E, of length D×(M−Z), where D is the length of each feature vector, M is the total number of clusters, and Z is the total number of noise clusters. The single embedding vector E may be used for downstream tasks, such as keyword classification. Following operation 512, method 500 may end.

Referring to FIG. 6, a flowchart of an exemplary method 600 for training a DNN (such as DNN 200) to detect inclusion of a keyword (such as a wakeword) or key-phrase, in an acquired acoustic signal, is shown. Method 600 may be implemented by a computing system, such as computing system 100, based on instructions stored in non-transitory memory.

Method 600 begins at operation 602, where a training data pair, from a plurality of training data pairs, is fed to a DNN, wherein the training data pair comprises an audio data vector, and a ground truth classification score corresponding to the audio data vector. In some embodiments, an average length of acoustic signals from which the plurality of training data pairs is derived is shorter in duration than an average length of a variable length acoustic signal to be recorded during implementation of the trained DNN. Similarly, in some embodiments, the audio data vector of the training data pair may be shorter than an audio data vector derived from an acoustic signal acquired during implementation of the trained DNN. In other words, as the DNNs employing the parametric pooling layers taught herein have an increased robustness to an amount/length of input data (e.g., a length of the audio data vector), a computational efficiency of training a DNN employing the parametric pooling layers taught herein may be improved by training said DNN on audio data vectors with little or no added background noise, augmentation, and with little or no non-signal containing portions. Thus, an advantage of a DNN employing a parametric pooling layer taught herein, is that the DNN may be trained on relatively clean, short keyword utterances, and effectively and efficiently applied to keyword detection in longer, lower signal-to-noise keyword utterances.

At operation 604, the computing system maps the audio data vector to a variable length feature map using a plurality of convolutional filters. In some embodiments, a feature vector is produced by the feature extractor for each timestep over which the acoustic signal was sampled, that is, each audio data value of the audio data vector is mapped to a corresponding feature vector by the feature extractor. In some embodiments, a feature vector is produced for two or more consecutive audio data values of the audio data vector. Feature extractor 208 may comprise a deep neural network, such as a convolutional neural network (CNN), a recurrent neural network (RNN) or a residual neural network (resnet).

At operation 606, the computing system pools a plurality of feature vectors of the variable length feature map using a parametric pooling layer to produce an embedding vector. The parametric pooling layer includes one or more trainable parameters (as discussed in more detail in the description of FIGS. 4 and 5 above) enabling the layer to learn to distinguish between informative feature vectors and non-informative/noisy feature vectors extracted from a variable length acoustic signal. In one example, a parametric pooling layer may aggregate a variable length feature map, comprising a plurality of feature vectors extracted from an acoustic signal, into an embedding vector of pre-determined length, by weighting each of the plurality of feature vectors based on one or more learned parameters in a parametric pooling layer, and aggregating the plurality of weighted feature vectors into the embedding vector.

At operation 608, the computing system maps the embedding vector to a predicted classification score using a classifier. The classifier may comprise one or more fully connected layers, wherein each fully connected layer may comprise a plurality of weights and biases. In one example, a number of input nodes of the classifier may equal a length of the embedding vector produced by the parametric pooling layer, and a number of output nodes of the classifier may equal a pre-determined number of classes for which classification scores are to be produced. The classifier may comprise a binary classifier, or multi-class classifier. The classifier may output one or more predicted classification scores for one or more keywords.

At operation 610, the computing system calculates a loss for the predicted classification score based on a difference between the predicted classification score and the ground truth classification score from the training data pair selected at operation 602. In one example, a loss function may include one or a combination of a cross entropy loss, a binary cross entropy loss, or other loss functions known in the art of machine learning.

At operation 612, the weights and biases of the DNN are adjusted based on the loss determined at operation 610. In some embodiments, the parameters of the feature classifier, parametric pooling layer, and feature extractor, may be adjusted in an end-to-end fashion, enabling each of the parameters of the. In some embodiments, back propagation of the loss may occur according to a gradient descent algorithm, wherein a gradient of the loss function (a first derivative, or approximation of the first derivative) is determined for each weight and bias of the deep neural network. Each weight (and bias) of the deep neural network is then updated by adding the negative of the product of the gradient determined (or approximated) for the weight (or bias) with a predetermined step size. Method 600 may then end. It will be noted that method 600 may be repeated for each of a plurality of training data pairs in a training data set, and this process may be repeated until a stop condition is met. Wherein, in some embodiments, the stop condition comprises one or more of the loss decreasing to below a threshold loss, a rate of loss change decreasing to below a threshold rate.

The invention claimed is:

1. A method for keyword detection, the method comprising:
    acquiring a variable length acoustic signal via an audio recording subsystem;
    transforming the variable length acoustic signal to a variable length feature map using a feature extractor, wherein the variable length feature map comprises a plurality of feature vectors;
    producing a plurality of cluster assignment scores for each of the plurality of feature vectors to each of a plurality of clusters, wherein the plurality of clusters comprises at least one signal cluster and at least one noise cluster;
    discarding a portion of the plurality of cluster assignment scores corresponding to the at least one noise cluster;
    producing a plurality of residual vectors by determining a difference between a center point of the at least one signal cluster and each of the plurality of feature vectors;
    weighting each of the plurality of residual vectors based on a corresponding cluster assignment score of the plurality of cluster assignment scores to produce a plurality of weighted feature vectors;

summing the plurality of weighted feature vectors to form an embedding vector;
mapping the embedding vector to a classification score for a pre-determined keyword using a classifier;
comparing the classification score against a classification score threshold; and
responding to the classification score exceeding the classification score threshold by:
  retrieving instructions indexed in non-transitory memory by the pre-determined keyword; and
  executing the instructions.

2. The method of claim 1, wherein producing the plurality of cluster assignment scores between each of the plurality of feature vectors and each of the plurality of clusters comprises:
  determining a dot product between a first feature vector of the plurality of feature vectors and a learned cluster assignment vector of a first cluster; and
  adding a bias corresponding to the first cluster to the dot product to produce an assignment score of the first feature vector to the first cluster.

3. The method of claim 1, wherein the feature extractor and the classifier comprise a plurality of parameters learned on a training dataset, and wherein an average signal-to-noise ratio of acoustic signals in the training dataset exceeds a signal-to-noise ratio of the variable length acoustic signal.

4. The method of claim 1, the method further comprising:
  encoding the variable length acoustic signal as a vector of audio data values by sampling the variable length acoustic signal at a plurality of timesteps.

5. The method of claim 1, wherein the feature extractor comprises a plurality of one-dimensional convolutional filters configured to extract a plurality of one-dimensional features from the variable length acoustic signal.

6. The method of claim 1, wherein the feature extractor and the classifier comprise a plurality of parameters learned on a training dataset, and wherein an average length of acoustic signals of the training dataset is shorter than a length of the variable length acoustic signal.

7. A system, comprising:
  a non-transitory memory, wherein the non-transitory memory comprises:
    a feature extractor comprising a plurality of learned convolutional filters;
    a parametric pooling layer;
    a classifier; and
    instructions;
  an audio recording subsystem; and
  a processor, wherein the processor is communicably coupled to the audio recording subsystem, and the non-transitory memory, and wherein, when executing the instructions, the processor is configured to:
    record an acoustic signal over a duration of time via a microphone of the audio recording subsystem;
    encode the acoustic signal into a variable length audio data vector;
    extract a plurality of feature vectors from the variable length audio data vector using the plurality of learned convolutional filters of the feature extractor, wherein a number of the plurality of feature vectors is proportional to the duration of time, and wherein each of the plurality of feature vectors encodes a plurality of features extracted by the feature extractor from a pre-determined interval of time of the duration of time;
    aggregate the plurality of feature vectors into an embedding vector using the parametric pooling layer;
    map the embedding vector to a classification score using the classifier;
    compare the classification score against a classification score threshold; and
    respond to the classification score exceeding the classification score threshold by:
      adjusting one or more system operating parameters.

8. The system of claim 7, wherein the classification score indicates a speaker identity, and wherein adjusting one or more system operating parameters includes:
  accessing a user profile based on the speaker identity; and
  adjusting one or more system operating parameters based on settings of the user profile.

9. The system of claim 7, wherein the embedding vector is of a pre-determined length, and wherein the pre-determined length is less than a length of the plurality of feature vectors.

10. The system of claim 7, wherein the one or more system operating parameters includes:
  a volume setting;
  a brightness of one or more lights communicably coupled to the processor; and
  a currently streaming media content.

11. A method comprising:
  acquiring an acoustic signal via an audio recording subsystem over a duration of time, wherein the acoustic signal includes an utterance, the utterance occurring over a portion of the duration of time;
  extracting a plurality of feature vectors using a plurality of learned convolutional filters of a feature extractor, wherein a number of the plurality of feature vectors is proportional to the duration of time, and wherein each of the plurality of feature vectors encodes a plurality of features extracted by the feature extractor from a pre-determined interval of time of the duration of time;
  aggregating the plurality of feature vectors using a parametric pooling layer to form an embedding vector, wherein the embedding vector is of a pre-determined length;
  mapping the embedding vector to a classification score using a classifier;
  determining if the utterance includes a keyword or key-phrase by comparing the classification score to a classification score threshold; and
  responding to the utterance including the keyword or key-phrase by:
    executing instructions indexed in non-transitory memory based on the keyword or key-phrase.

12. The method of claim 11, wherein the portion is from 1% to 10% of the duration of time.

13. The method of claim 11, wherein executing the instructions indexed in the non-transitory memory based on the keyword or key-phrase comprises:
  accessing data stored at a location of the non-transitory memory indexed according to the keyword or key-phrase;
  generating an audio message based on the data; and
  broadcasting the audio message via an audio transmitting subsystem.

14. The method of claim 11, wherein the portion of the duration of time over which the utterance occurs is greater than the pre-determined interval of time.

15. The method of claim 11, wherein the parametric pooling layer is positioned between the feature extractor and the classifier, and wherein the parametric pooling layer receives a feature map comprising the plurality of feature vectors produced by the feature extractor.

16. The method of claim 11, wherein the parametric pooling layer weights a first feature vector of the plurality of feature vectors based on a degree of match between the first feature vector and one or more learned query vectors.

17. The method of claim 11, wherein aggregating the plurality of feature vectors using a parametric pooling layer to form an embedding vector comprises:
   determining a first cluster assignment score for a feature vector of the plurality of feature vectors to a signal cluster;
   determining a second cluster assignment score for the feature vector to a noise cluster;
   normalizing the first cluster assignment score based on a sum of the first cluster assignment score and the second cluster assignment score to produce a normalized cluster assignment score;
   determining a residual for the feature vector by subtracting a center point of the signal cluster from the feature vector;
   weighting the residual with the normalized cluster assignment score to produce a weighted residual vector; and
   aggregating the weighted residual with a plurality of residual vectors produced from the plurality of feature vectors to form the embedding vector.

* * * * *